United States Patent [19]

Crute

[11] Patent Number: 4,678,097

[45] Date of Patent: Jul. 7, 1987

[54] BREAKAWAY GAS GAP

[75] Inventor: Billy G. Crute, Connersville, Ind.

[73] Assignee: Stant Inc., Connersville, Ind.

[21] Appl. No.: 883,563

[22] Filed: Jul. 9, 1986

[51] Int. Cl.$^4$ .................... B65D 41/04; B65D 41/32
[52] U.S. Cl. ................................. 220/288; 220/266; 220/DIG. 33
[58] Field of Search ............... 220/266, 288, DIG. 33

[56] References Cited

U.S. PATENT DOCUMENTS

| | | | |
|---|---|---|---|
| 3,405,837 | 10/1968 | Carpenter, Jr. | 220/288 |
| 3,856,316 | 12/1974 | Badberg | 220/DIG. 33 |
| 4,091,955 | 5/1978 | Sloan, Sr. | 220/288 |
| 4,142,756 | 3/1979 | Henning et al. | 220/86 R |
| 4,177,931 | 12/1979 | Evans | 220/288 |
| 4,458,824 | 7/1984 | Baker | 220/288 |
| 4,494,673 | 1/1985 | Hiraishi | 220/288 |

Primary Examiner—George T. Hall
Attorney, Agent, or Firm—Barnes & Thornburg

[57] ABSTRACT

A cap for closing a fuel fill neck of a vehicle is provided. The cap includes an axially extending housing that is adapted to engage and seal the neck. the cap further includes a first flange that extends radially outwardly from the axially upper portion of the housing and includes a groove formed therein to form a frangible portion. An outer cover is attached to the first flange that is adapted to be broken away upon impact. The cap further includes a second flange spaced axially below the first flange and configured to engage a gasket to seal the fill neck. The second flange is adapted to remain intact to seal the neck after the outer cover and the first flange are fractured and displaced from the cap.

10 Claims, 5 Drawing Figures

BREAKAWAY GAS GAP

The present invention relates to gas caps and particularly to gas caps adapted to close and seal the fuel filler neck of an automobile. More particularly, the present invention relates to a gas cap adapted to maintain an adequate seal in the filler neck after the outer portion of the cap is subjected to an impact of sufficient intensity to break the outer portion.

Gas caps that provide a breakaway feature are generally known. One such known breakaway gas cap is disclosed in U.S. Pat. No. 4,177,931 issued Oct. 4, 1978, and assigned to Stant Inc., the assignee of the present invention. U.S. Pat. No. 4,177,931 discloses a gas cap having an upper portion that includes a disc-like central portion with projecting portions cantilevered to the central portion. The central portion forms a radially outwardly extending flange that engages a gasket to seal the filler neck of a fuel tank. Between the radial outer edge of the central portion and each projecting portion is a groove to provide a site for stress concentration to allow the projecting portion to break away under the force of an impact.

It is an object of the present invention to provide a breakaway fuel cap in which the breakaway flange is independent of the flange which effects the seal between the cap and the filler neck. This will allow the flange supporting the outer cover to be broken away without affecting in any way the seal between the cap and the filler neck.

According to the present invention, a cap for closing an automobile fuel filler neck is provided that includes an axially extending housing adapted to engage and close the neck. The cap also includes a radially outwardly extending first flange attached to the axially upper portion of the housing, with the first flange including a frangible portion. An outer cover is attached to the first flange to allow the cover to break away due to an impact without breaking the housing itself. A radially outwardly extending second flange is also attached to the housing spaced axially downwardly from the first flange. The second flange is configured to engage a gasket to sealingly close the filler neck, whereby an impact on the outer cover will fracture the frangible portion of the first flange leaving the housing and the second flange intact to close the filler neck.

One feature of the foregoing structure is the provision of the second flange spaced axially downwardly from the first frangible flange and configured to engage a gasket to sealingly close the filler neck. One advantage of this feature is that should the first flange crack or otherwise fracture when the frangible portion breaks away, the seal between the filler neck and the housing will not be affected.

In preferred embodiments of the present invention, the first flange is formed to include a groove at a point substantially adjacent the housing to define the frangible portion of the first flange.

Also in preferred embodiments of the present invention, the axially extending housing includes a radially inwardly extending groove formed in its outer surface at a point adjacent the attachment point of the first flange. One feature of the foregoing structure is that the first flange and the axially upper portion of the housing will break away when the outer cover is subjected to an impact. One advantage of this feature is that the outer cover and first flange are more easily broken away upon an impact, leaving the second flange and remaining portion of the housing intact to seal the filler neck.

Additional objects, features, and advantages of the invention will become apparent to those skilled in the art upon consideration of the following detailed description of preferred embodiments exemplifying the best modes of carrying out the invention as presently perceived. The detailed description particularly refers to the accompanying figures in which:

Figure 1:
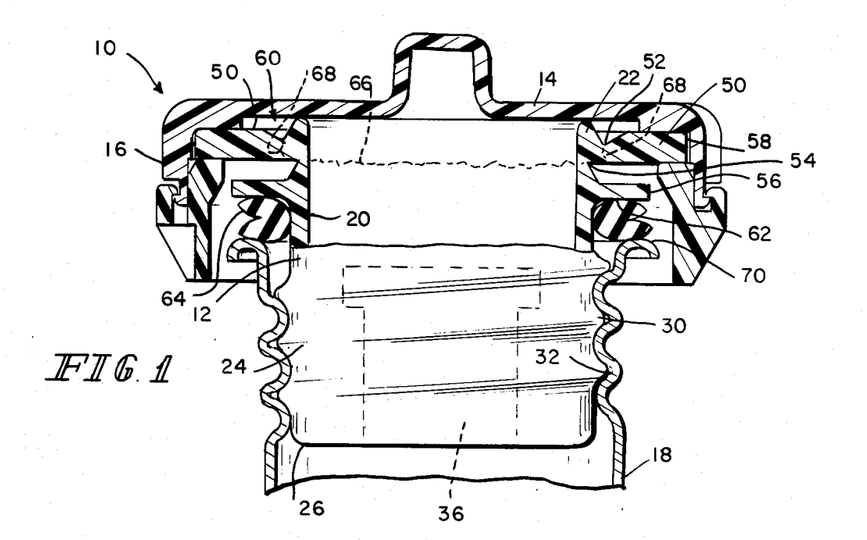
FIG. 1 is a transverse sectional view of one embodiment of the present invention.

Referring now to the drawings, and particularly to FIG. 1, a gas cap 10 is shown that includes an axially extending cylindrical housing 12. The cap 10 also includes an outer cover 14 including an outer surface 16 which is adapted to be gripped by the user in inserting and removing the cap 10. The cap 10 forms a closure for the opening of a gasoline tank (not shown) and, as shown, is used to close a gasoline filler neck 18 of an automobile.

The cylindrical housing 12 includes an axially extending cylindrical wall 20 having an upper portion 22, a center portion 24, and lower portion 26. Threads 30 are formed on the exterior surface of the cylindrical wall 20 to engage like threads 32 formed on the interior surface of the filler neck 18 in a conventional manner.

A pressure-vacuum valve 36 is disposed within the housing 12. The pressure-vacuum value 36 controls venting of pressure and vacuum which develop within the fuel tank in a manner which is well known. Such pressure-vacuum valves are known in the art, and pressure-vacuum valve 36 is shown for illustrative purposes only. A radially outwardly extending flange or disc portion 50 is attached to the upper portion 22 of the housing 12. A circular groove 52 is formed in the upper surface of the disc portion 50 to weaken the disc 50. Thus, a frangible portion 60 of the disc 50 is formed between the groove 52 and an outer end 58 of the disc 50. The outer shell 14 engages the frangible portion 60 of the disc 50 near the outer end 58 in a conventional manner.

Although the groove 52 in the disc portion 50 weakens the disc portion to form a frangible portion 60, it may be desirable to also weaken the upper portion 22 of the cylindrical wall 20 of the housing 12. This weakening of the cylindrical wall 20 is accomplished by a goove 54 that extends radially inwardly into the cylindrical wall 20 at a location adjacent the attachment point of the disc portion 50. The provision of the groove 54 in the cylindrical wall 20 enhances the break-away characteristics of the cap 20. Thus, while an impact on the cover 14 from one direction may cause the frangible portion 60 of the disc portion 50 to fracture, an impact from another direction may cause the upper portion 22 of the cylindrical wall 20 to fracture, with the results of both impacts being that the force will be distributed to portions of the cap where a fracture will not affect the seal in the filler neck 18.

A radially outwardly extending flange 56 is attached to the cylindrical wall 20 of the housing 12 at a location spaced axially inwardly from the disc portion 50. The outwardly extending flange 56 is formed on its axially lower side to include a shoulder 62 which captures a gasket 64 between an upper lip 70 of the filler neck 18 and the shoulder 62. The gasket 64 cooperates with the shoulder 62 and the upper lip 70 to sealingly close the filler neck 18.

As can be seen in FIG. 1, flange 56 is located on the cylindrical wall 20 at a position below the groove 54. Therefore, should the upper portion 22 of the cylindrical wall 20 be fractured at the level of the groove 54, the integrity of the flange 56 will not be affected. Also, should the frangible portion 60 of the disc portion 50 be fractured along the groove 52, the location of the flange 56 axially below the disc portion 50 will maintain the integrity of the flange 56. Thus, the upper portion 22 of the cylindrical wall 20 may fracture at the level of the groove 54 as indicated by a fracture line 66, or the disc portion 50 may fracture along the groove 52 as indicated by fracture line 68, to cause the cover 14 to be displaced from the housing 12, and the seal between the flange 56 and the upper lip 70 will not be affected.

Figure 3:
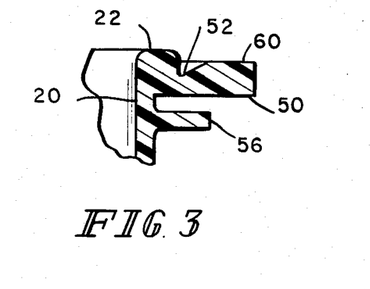
FIG. 3 is a partial sectional view of a modification of the upper portion of the wall of the housing.

Referring to FIG. 3, it may be advantageous in some applications to strengthen the upper portion 22 of the cylindrical wall 20 by increasing its radial thickness. In this modification, the groove 52 will be placed immediately adjacent the cylindrical wall 20 to form the frangible portion 60 in the disc 50. Also, in this modification, it is generally not desired to allow the upper portion 22 of the cylindrical wall 20 to fracture transversely. Thereore, groove 54 is omitted in this configuration.

Figure 4:
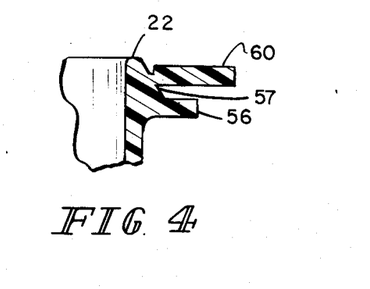
FIG. 4 is a partial sectional view of a modification of the flange of the present invention.

Referring now to FIG. 4, it may be advantageous in certain applications to strengthen the upper portion 22 of the cylindrical wall 20 at a position adjacent the attachment point of the flange 56. As seen in FIG. 4, this is accomplished by providing a buttress 57 adjacent the cylindrical wall 20 between the disc portion 50 and the flange 56. This configuration generally strengthens the flange 56, thereby providing a more impact resistant seal betwwen the flange 56 and the upper lip 70 of the filler neck 18.

Figure 5:
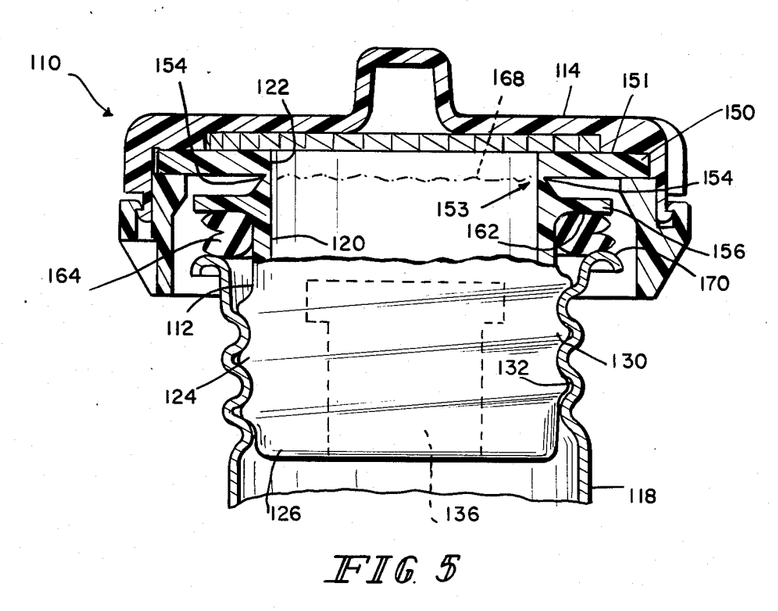
FIG. 5 is a transverse sectional view of another embodiment of the present invention.

Referring now to FIG. 5, another embodiment of the present invention is shown. The embodiment is FIG. 5 shows a gas cap 110 that includes an axially extending cylindrical housing 112. The cap 110 also includes an outer cover 114 which is similar to the outer cover 14 in the embodiment shown in FIG. 1. Like the cap 10, the cap 110 forms a closure for the opening of a gasoline tank (not shown), and is used to close a gasoline filler neck 118 of an automobile.

The cylindrical housing 112 includes an axially extending cylindrical wall 120 having an upper portion 122, a center portion 124, and a lower portion 126. Threads 130 are formed on the exterior surface of the cylindrical wall 120 to engage like threads 132 formed on the interior surface of the filler neck 118 in a conventional manner.

A pressure-vacuum valve 136 is disposed within the housing 112. The pressure-vacuum valve 136, like the pressure-vacuum valve 36, is shown for illustrative purposes only.

The principal difference between the embodiment shown in FIG. 5, and the embodiment shown in FIG. 1, is in the configuration of the flange or disc portion. The embodiment shown in FIG. 5 includes a radially outwardly extending flange or disc portion 150. The disc portion 150 includes a planar upper surface 151. The disc portion 150 is cantilevered from the axially upper portion 122 of the cylindrical wall 120. The upper portion 122 of the cylindrical wall 120 includes a groove 154 formed in its outer surface at a point adjacent the attachment point of the disc portion 150. The groove 154 forms a frangible portion 153 of the cylindrical wall 120. When the outer cover 114 is subjected to an impact, the frangible portion 153 of the cylindrical wall 120 will fracture along the groove 154 as indicated by the fracture line 168. Thus, when the cover 114 is subjected to an impact, the entire disc portion 150 and attached outer cover 114 will be severed from the cap 110.

A radially outwardly extending flange 156 is attached to the cylindrical wall 120 at a location spaced axially inwardly from the disc portion 150 and the groove 154. The outwardly extending flange 156 is formed on its axially lower side to include a shoulder 162 which captures a gasket 164 between an upper lip 170 of the filler neck 118 and the shoulder 162.

As can be seen in FIG. 5, the flange 156 is located on the cylindrical wall 120 at a position below the groove 154 and fracture line 168. Therefore, should the disc portion 150 and attached cover 114 be severed from the cap 110 along the fracture line 168, the remaining portion of the housing 112, including the flange 156 will remain intact to seal filler neck 118.

The invention is particularly adaptable to gas caps in which the outer cover 14 is attached to the housing 12 in such a manner as to allow the outer cover 14 to rotate the housing 12 in one direction, but providing slip in the event the rotational torque exceeds a predetermined level in that direction, while capable of rotating the housing 12 in the opposite direction without slip.

Figure 2:
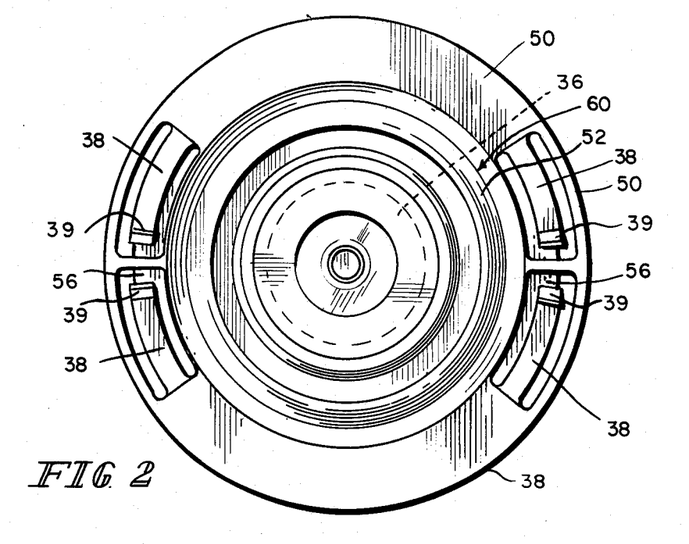
FIG. 2 is a top plan view of the cap without the cover in place.

Referring now to FIG. 2, such a gas cap is shown that includes projecting portions 38 cantilevered to the disc portion 50. The projecting portions 38 are formed from plastic and include pawl fingers 39 at their outer ends. The outer cover 14 includes means (not shown) to engage the pawl fingers 39 in a manner that is known in the art, which, when combined with the resiliency of the plastic material in the pawl fingers, permits only limited torque to be applied to the housing 12 by the outer cover 14 in one direction.

In operation, in the embodiment disclosed in FIG. 1, when the outer cover 14 is subjected to an impact of sufficient strenghth, the frangible portion 60 of the disc 50 will fracture lines 68 to allow the cover 14 to be displaced from the housing 12. The seal between the flange 56 and the upper lip 70 effected by the gasket 64 will not be affected. If the impact on the outer cover 14 originates from a different direction, the upper portion 22 of the cylindrical wall 20 may fracture at the fracture line 66. This action will also allow the cover 14 to be displaced from the housing 12 without affecting the seal between the flange 56 and the upper lip 70. In the embodiment shown in FIG. 5, when the outer cover 114 is subjected to an impact, the frangible portion 153 of the cylindrical wall 120, including the disc portion 150, will fracture along the fracture line 168. The entire disc portion 150 and outer cover 114 will then be displaced from the cap 110. Because the flange 156 is located axially below the groove 154 and fracture line 168, the flange 156 and remaining portion of the housing 112 will remain intact to seal the filler neck 118. Thus, the invention provides a gaoline cap which will reduce the likelihood of gasoline spillage in the event of an accident.

Although the invention has been described in detail with reference to preferred embodiments and specific examples, variations and modifications exist within the scope and spirit of the invention as described and defined in the following claims.

What is claimed is:

1. A cap for closing an automobile fuel fill neck comprising:
   an axially extending housing adapted to engage and seal said neck;
   said housing having a radially outwardly extending first flange on the axially upper portion of said housing, said first flange including a frangible portion;
   an outer cover attached to said first flange;
   said housing also having a radially outwardly extending second flange spaced axially downwardly from said first flange, said second flange configured to engage a gasket in said fill neck to seal said neck, whereby an impact on said outer cover will fracture said frangible portion of said first flange leaving said housing and said second flange intact to seal said neck.

2. The cap of claim 1, wherein said first flange is formed to include a first groove to define said frangible portion of said first flange.

3. The cap of claim 2, wherein said first groove is V-shaped.

4. The cap of claim 3, wherein said first flange comprises an annular disc, and said first groove is formed between the radially outer edge of the first flange and the housing.

5. The cap of claim 4, wherein said first flange includes an axially upper surface and said first groove is formed in said axially upper surface at a point substantially adjacent said housing.

6. The cap of claim 1, further comprising a second groove that circumferentially extends around the axially upper portion of said housing to form an axially upper frangible portion of said housing.

7. The cap of claim 1, wherein said first and second flanges extend in a spaced apart, substantially parallel relation to each other.

8. The cap of claim 1, wherein said first flange includes an outer periphery and said outer cover is configured to engage said outer periphery.

9. A cap for closing a fuel fill neck including an axially upwardly facing sealing lip, the cap comprising:
   an axially extending housing adapted to engage and seal said neck;
   a first flange that extends radially outwardly from the axially upper portion of said housing;
   a first groove formed in said upper portion of said housing to weaken said upper portion of said housing to form a frangible portion of said housing;
   an outer cover attached to said first flange; and
   a second flange spaced axially below said first flange and said groove that extends radially outwardly from said housing and configured to capture a gasket between said sealing lip of said neck and said second flange to seal said neck, whereby an impact on said outer cover will cause said frangible portion of said housing to fracture to allow said outer cover and first flange to be displaced leaving said second flange intact to seal said neck.

10. In a break-away fuel cap of the type comprising an axially extending housing for engaging and sealing the fuel filler neck of an automobile, a frangible, radially outwardly extending first flange attached to the housing near its axially upper end, and an outer cover attached to the first flange, the improvement comprising a radially outwardly extending second flange spaced axially downwardly from said first flange and configured to engage a seal to close said filler neck.

* * * * *

REEXAMINATION CERTIFICATE (3862nd)

United States Patent [19]

Crute

[11] B1 4,678,097
[45] Certificate Issued Sep. 7, 1999

[54] BREAKAWAY GAS CAP

[75] Inventor: Billy G. Crute, Connersville, Ind.

[73] Assignee: Stant Manufacturing, Inc.

Reexamination Requests:
No. 90/004,608, Apr. 14, 1997
No. 90/004,695, Jun. 20, 1997

Reexamination Certificate for:
Patent No.: 4,678,097
Issued: Jul. 7, 1987
Appl. No.: 06/883,563
Filed: Jul. 9, 1986

[51] Int. Cl.⁶ .......................... B65D 41/04; B65D 41/32
[52] U.S. Cl. .................. 220/288; 220/266; 220/DIG. 33
[58] Field of Search .................................... 220/266, 276, 220/270, 288, DIG. 33

[56] References Cited

U.S. PATENT DOCUMENTS

| | | |
|---|---|---|
| 4,142,756 | 3/1979 | Henning et al. . |
| 4,144,994 | 3/1979 | Brickeen, Sr. ........................ 220/276 X |
| 4,177,931 | 12/1979 | Evans . |
| 4,498,493 | 2/1985 | Harris . |
| 4,572,396 | 2/1986 | Kasugai et al. . |

FOREIGN PATENT DOCUMENTS

| | | |
|---|---|---|
| 53-165211 | 12/1978 | Japan . |
| 57-18288 | 4/1982 | Japan . |
| 56-147868 | 3/1983 | Japan . |
| 58-49525 | 3/1983 | Japan . |
| 58-153180 | 4/1985 | Japan . |

OTHER PUBLICATIONS

Stant Drawing #30600–A1 for Fuel Cap Assembly dated Jul. 8, 1982.

*Primary Examiner*—Allan N. Shoap

[57] ABSTRACT

A cap for closing a fuel fill neck of a vehicle is provided. The cap includes an axially extending housing that is adapted to engage and seal the neck, the cap further includes a first flange that extends radially outwardly from the axially upper portion of the housing and includes a groove formed therein to form a frangible portion. An outer cover is attached to the first flange that is adapted to be broken away upon impact. The cap further includes a second flange spaced axially below the first flange and configured to engage a gasket to seal the fill neck. The second flange is adapted to remain intact to seal the neck after the outer cover and the first flange are fractured and displaced from the cap.

B1 4,678,097

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, between lines 7 and 8:

*The first flange 50 includes an axially upper surface 210 facing upwardly toward outer cover 14, an axially lower surface 212 facing downwardly away from outer cover 14, and a radially outer edge 214 facing away from housing 12. The axially upper surface 210 includes a radially outer portion 222 and a radially inner portion 224. The radially outer edge 214 and radially outer portion 222 of axially upper surface 210 comprise an outer wall 216 of first flange 50. Outer cover 14 engages outer wall 216 and the radially outer portion 222 of axially upper surface 210 is in abutting contact with outer cover 14. Grooves 52 is formed to include an opening in the radially inner portion 224 of axially upper surface 210.*

*The groove 54 is defined by an upper edge 218 and a lower edge 220. The axially lower surface 212 of first flange 50 is co-extensive with upper edge 218 so that axially lower surface 212 of first flange 50 intersects groove 54.*

THE DRAWING FIGURES HAVE BEEN CHANGED AS FOLLOWS:

Reference numerals 210, 212, 214, 216, 218, 220, 222 and 224 have been added to FIG. 1.

AS A RESULT OF REEXAMINATION, IT HAS BEEN DETERMINED THAT:

Claims 1–10 are cancelled.

New claims 11–46 are added and determined to be patentable.

11. *A cap for closing an automobile fuel fill neck comprising*
   *an axially extending housing adapted to engage and seal said fuel fill neck, said housing having a radially outwardly extending first flange on an axially upper portion of said housing, said first flange including a frangible portion and an outer wall,*
   *an outer cover attached to said first flange at the outer wall of the first flange, said housing also having a radially outwardly extending second flange spaced axially downwardly from said first flange, said second flange configured to engage a gasket in said fuel fill neck to seal said fuel fill neck, whereby an impact on said outer cover will fracture said frangible portion of said first flange leaving said housing and said second flange intact to seal said neck.*

12. *The cap of claim 11, wherein said first flange is formed to include a groove to define said frangible portion of said first flange.*

13. *The cap of claim 12, wherein the groove formed in the first flange is positioned to lie between the outer wall and the housing.*

14. *The cap of claim 13, wherein the first flange includes an axially upper surface including a radially outer portion engaging the outer cover and a radially inner portion lying between the radially outer portion and the housing and the groove is formed to include an opening in the radially inner portion.*

15. *The cap of claim 12, wherein said groove formed in the first flange is V-shaped.*

16. *The cap of claim 12, wherein said first flange comprises an annular disc, and said groove formed in the first flange is formed between the radially outer edge of the first flange and the housing.*

17. *The cap of claim 16, wherein said first flange includes an axially upper surface and said groove is formed in said axially upper surface at a point substantially adjacent said housing.*

18. *The cap of claim 16, wherein the groove formed in the first flange is positioned to lie between the radially outer edge of the first flange and the housing.*

19. *The cap of claim 11, wherein said first and second flanges extend in a spaced apart, substantially parallel relation to each other.*

20. *The cap of claim 11, wherein the outer cover is positioned to lie in abutting contact with the outer wall of the first flange.*

21. *The cap of claim 11, wherein the first flange further includes an upper surface facing upwardly toward the outer cover, a lower surface facing downwardly away from the outer cover, and a radially outer edge facing away from the housing and the outer wall includes the radially outer edge of the first flange and a radially outer portion of the upper surface of the first flange.*

22. *The cap of claim 21, wherein the radially outer portion of the upper surface of the first flange is positioned to lie in abutting contact with the outer cover.*

23. *The cap of claim 11, wherein the first flange has an axially lower surface facing away from the outer cover and further comprising a groove formed on the axially upper portion of said housing and located on the housing such that an upper edge of the grove formed in the housing is co-extensive with the axially lower surface of the first flange to form an axially upper frangible portion of said housing.*

24. *The cap of claim 11, wherein the housing includes a frangible portion positioned to lie between the first and second flanges.*

25. *The cap of claim 24, wherein the housing includes a groove formed in the axially upper portion of the housing to weaken the axially upper portion of the housing to form the frangible portion of the housing.*

26. *The cap of claim 11, wherein the first flange includes an outer wall and the outer cover is attached to the first flange at the outer wall of the first flange.*

27. *In a break-away fuel cap of the type comprising an axially extending housing for engaging and sealing the fuel filler neck of an automobile, a frangible, radially outwardly extending first flange attached to the housing near its axially upper end, and an outer cover attached to the first flange, the improvement comprising a radially outwardly extending second flange spaced axially downwardly from said first flange and configured to engage a seal to close said filler neck, a reduced strength frangible portion formed in the housing to lie between the first and second flanges, the first flange including an upper surface facing upwardly toward the outer cover and a horizontal lower surface facing downwardly away from the outer cover and connected to the upper surface of the first flange by a radial outer edge of the first flange, the second flange including a gasket-engaging* surface positioned to lie adjacent to the gasket to close said fuel filler neck, and the horizontal lower surface of the first flange intersects the reduced strength frangible portion formed in the housing.

28. The cap of claim 27, wherein the first and second flanges are spaced apart.

29. The cap of claim 27, wherein the frangible portion formed in the first flange is defined by a groove formed in the first flange.

30. The cap of claim 29, wherein the groove is V-shaped.

31. The cap of claim 27, wherein the second flange includes an outer surface facing upwardly toward the first flange and a lower surface facing downwardly away from the first flange and the lower surface of the second flange defines the gasket-engaging surface.

32. In a break-away fuel cap of the type comprising an axially extending housing for engaging and sealing the fuel filler neck of an automobile, a frangible, radially outwardly extending first flange attached to the housing near its axially upper end, and an outer cover attached to the first flange, the improvement comprising a radially outwardly extending second flange spaced axially downwardly from said first flange and configured to engage a seal to close said filler neck, a frangible portion formed in the housing to lie between the first and second flanges, the first flange including an upper surface facing upwardly toward the outer cover and a lower surface facing downwardly away from the outer cover and connected to the upper surface of the first flange by a radial outer edge of the first flange, the second flange including a gasket-engaging surface positioned to lie adjacent to the gasket to close said fuel filler neck, and the lower surface of the first flange intersects the frangible portion formed in the housing, wherein the frangible portion formed in the housing is defined by a groove formed in the housing.

33. The cap of claim 32, wherein the groove is V-shaped.

34. In a break-away fuel cap of the type comprising an axially extending housing for engaging and sealing the fuel filler neck of an automobile, a frangible, radially outwardly extending first flange attached to the housing near its axially upper end, and an outer cover attached to the first flange, the improvement comprising a radially outwardly extending second flange spaced axially downwardly from said first flange and configured to engage a seal to close said filler neck, a frangible portion formed in the housing to lie between the first and second flanges, the first flange including an upper surface facing upwardly toward the outer cover and a lower surface facing downwardly away from the outer cover, the second flange including a gasket-engaging surface positioned to lie adjacent to the gasket to close said fuel filler neck, and the lower surface of the first flange intersects the frangible portion formed in the housing wherein the first flange further includes an outer wall and the outer cover is in abutting contact with the outer wall of the first flange.

35. In a break-away fuel cap of the type comprising an axially extending housing for engaging and sealing the fuel filler neck of an automobile, a frangible, radially outwardly extending first flange attached to the housing near its axially upper end and an outer cover attached to the first flange, the improvement comprising a radially outwardly extending second flange spaced axially downwardly from said first flange and configured to engage a seal to close said filler neck, a frangible portion formed in the housing to lie between the outer cover and second flange, the first flange including an outer wall, the second flange including a gasket-engaging surface positioned to lie adjacent to the gasket to close said fuel filler neck and the outer cover engages the outer wall of the first flange.

36. The cap of claim 35, wherein the first flange further includes an upper surface facing upwardly toward the outer cover, a lower surface facing downwardly away from the outer cover, and a radially outer edge facing away from the housing and the outer wall includes the radially outer edge of the first flange and a portion of the upper surface of the first flange.

37. The cap of claim 36, wherein the portion of the upper surface of the first flange that is in the outer wall is positioned to lie in abutting contact with the outer cover.

38. The cap of claim 35, wherein the outer wall of the first flange is in abutting contact with the outer cover.

39. The cap of claim 35, wherein the frangible portion formed in the housing is positioned to lie between the first and second flanges.

40. The cap of claim 35, wherein the first flange further includes an upper surface facing upwardly toward the outer cover and a lower surface facing downwardly away from the outer cover and the lower surface of the first flange intersects the frangible portion formed in the housing.

41. The cap of claim 35, wherein the housing includes an axially upper portion and a groove formed in the axially upper portion of the housing to weaken the axially upper portion of the housing to form the frangible portion of the housing.

42. A cap for closing a fuel fill neck including an axially upwardly facing sealing lip, the cap comprising an axially extending housing adapted to engage and seal said neck, a first flange that extends radially outwardly from an axially upper portion of said housing, the first flange having an outer wall, a groove formed in the axially upper portion of said housing to weaken said axially upper portion of said housing to form a frangible portion of said housing, an outer cover attached to said first flange at the outer wall of the first flange, and a second flange spaced axially below said first flange and said groove, the second flange extending radially outwardly from said housing and configured to capture a gasket between said sealing lip of said fuel fill neck and said second flange to seal said fuel fill neck, whereby an impact on said outer cover will cause said frangible portion of said housing to fracture to allow said outer cover and first flange to be displaced leaving said second flange intact to seal said neck.

43. The cap of claim 42, wherein the first flange has an axially lower surface and wherein an upper portion of the groove is co-extensive with the axially lower surface of the first flange.

44. A cap for closing a fuel fill neck including an axially upwardly facing sealing lip, the cap comprising an axially extending housing adapted to engage and seal said neck, a first flange that extends radially outwardly from an axially upper portion of said housing, the first flange having an axially lower surface, a groove formed in said axially upper portion of said housing to weaken said axially upper portion of said housing to form a frangible portion of said housing, said groove having an upper edge co-extensive with the axially lower surface of said first flange, an outer cover attached to said first flange, and a second flange spaced axially below said first flange and said groove, the second flange extends radially outwardly from said housing and configured to capture a gasket between said sealing lip of said fuel fill neck and said second flange to seal said fuel fill neck, whereby an impact on said outer cover will cause said frangible portion of said housing to fracture to allow said outer cover and first flange to be displaced leaving said second flange intact to seal said neck.

45. The cap of claim 44, wherein the first flange includes an outer wall and the outer cover is attached to the first flange at the outer wall of the first flange.

46. A cap for closing an automobile fuel fill neck comprising an axially extending housing adapted to engage and seal said fuel fill neck, said housing having a radially outwardly extending first flange on an axially upper portion of said housing, said first flange including a frangible portion and a lower surface, an outer cover attached to said first flange, said housing also having a radially outwardly extending second flange spaced axially downwardly from said first flange and a groove formed in said axially upper portion of said housing to weaken said axially upper portion of said housing to form a frangible portion of said housing, said groove having an upper edge co-extensive with the axially lower surface of said first flange, said second flange configured to engage a gasket in said fuel fill neck to seal said fuel fill neck, whereby an impact on said outer cover will fracture said frangible portion of said first flange leaving said housing and said second flange intact to seal said neck.

* * * * *